United States Patent
Sutter, Jr. et al.

(10) Patent No.: US 7,575,282 B2
(45) Date of Patent: Aug. 18, 2009

(54) FOLDABLE HEAD RESTRAINT

(75) Inventors: Robert R. Sutter, Jr., Belmont, MI (US); Jeremy J. Gauthier, Plainwell, MI (US)

(73) Assignee: Gill Industries, Inc., Grand Rapids, MI (US)

( * ) Notice: Subject to any disclaimer, the term of this patent is extended or adjusted under 35 U.S.C. 154(b) by 574 days.

(21) Appl. No.: 10/797,294

(22) Filed: Mar. 10, 2004

(65) Prior Publication Data
US 2005/0225146 A1   Oct. 13, 2005

(51) Int. Cl.
*A47C 7/36* (2006.01)
(52) U.S. Cl. ...................... 297/403; 297/408
(58) Field of Classification Search ................ 297/403, 297/408
See application file for complete search history.

(56) References Cited

U.S. PATENT DOCUMENTS

| | | | |
|---|---|---|---|
| 2,976,915 A | 3/1961 | Spound | |
| 2,984,293 A | 5/1961 | Bontempi et al. | |
| 3,065,029 A | 11/1962 | Spound et al. | |
| 3,695,700 A | 10/1972 | Flach | |
| 4,353,595 A | 10/1982 | Kaneko et al. | |
| 4,576,413 A | 3/1986 | Hatta | |
| 4,600,240 A | 7/1986 | Suman et al. | |
| 4,682,817 A | 7/1987 | Freber | |
| 4,761,034 A | 8/1988 | Saito | |
| 4,830,434 A | 5/1989 | Ishida et al. | |
| 5,145,233 A | 9/1992 | Nagashima | |
| 5,181,758 A | 1/1993 | Sandvik | |
| 5,346,277 A | 9/1994 | Holobaugh et al. | |
| 5,492,386 A | 2/1996 | Callum | |
| 5,590,933 A | 1/1997 | Andersson | |
| 5,642,918 A | 7/1997 | Sakamoto et al. | |
| 5,681,079 A * | 10/1997 | Robinson | 297/408 X |
| 5,927,804 A | 7/1999 | Cuevas | |
| 6,024,405 A | 2/2000 | MacAndrew et al. | |
| 6,050,633 A | 4/2000 | Droual | |
| 6,074,011 A | 6/2000 | Ptak et al. | |
| 6,129,421 A * | 10/2000 | Gilson et al. | 297/408 X |
| 6,183,045 B1 * | 2/2001 | Marfilius et al. | 297/408 X |
| 6,485,096 B1 | 11/2002 | Azar et al. | |

(Continued)

FOREIGN PATENT DOCUMENTS

DE   31 29 063 A1   4/1983

(Continued)

*Primary Examiner*—Anthony D Barfield
(74) *Attorney, Agent, or Firm*—Butzel Long

(57) ABSTRACT

A foldable head restraint has two head restraint supports set within a bracket. A latch is made integral with at least one of the head restraint supports. The latch rests against a stop to prohibit rotation of the head restraint support in a first direction. The latch rests against a rotational cam to prohibit movement of the head restraint support in a second direction. By rotating the cam, the head restraint support may be folded. The head restraint support is comprised of a metal substrate with over-molded plastic geometry to accept a mating part configured within the head restraint bun. The geometry of the metal substrate and over-molded plastic geometry allow for a reduction, or even elimination, of the slots that are normally required for such a folding head restraint. This ability to fold can yield greater rearward visibility and aid in the kinematic motion of the seat.

7 Claims, 6 Drawing Sheets

U.S. PATENT DOCUMENTS

| | | |
|---|---|---|
| 6,499,805 B1 | 12/2002 | Watadani |
| 6,517,156 B1 | 2/2003 | Lin |
| 6,612,653 B2 | 9/2003 | Takata |
| 6,702,385 B2 | 3/2004 | Holdampf et al. |
| 6,761,548 B1 | 7/2004 | Snop |
| 2001/0054837 A1 | 12/2001 | O'Connor |
| 2003/0234567 A1 | 12/2003 | O'Connor |
| 2005/0067874 A1* | 3/2005 | Kamrath et al. ......... 297/408 X |

FOREIGN PATENT DOCUMENTS

| | | |
|---|---|---|
| DE | 33 25 927 C1 | 1/1985 |
| FR | 2 796 345 A | 1/2001 |

* cited by examiner

US 7,575,282 B2

FOLDABLE HEAD RESTRAINT

BACKGROUND OF THE INVENTION

The invention relates generally to vehicle head restraints and more particularly to foldable vehicle head restraints.

Head restraints protect a vehicle occupant from serious injury due to sudden movement of the vehicle. The head restraints generally extend upward from the seat.

While the head restraints are necessary to insure the safety of passengers, at times the head restraints can present difficulties. Head restraints can obstruct the driver's view when looking rearward. If a seat is folded forward to allow a passenger to enter the rear portion of a vehicle, the head restraint may contact an object in front of the seat thus stopping the seat from fully folding down. In vehicles with seats that fold flat into the floor, the head restraint must be removed or additional stowage space in the floor of the vehicle must be provided.

A foldable head restraint has been described in U.S. patent application Ser. No. 10/672,703, assigned to the assignee of this patent application. A foldable head restraint has a design position where the head restraint is generally upright and serves as protection for a vehicle passenger. The foldable head restraint also has a folded position, where the head restraint is rotated to allow complete kinematic movement of the seatback, or to increase rearward visibility.

While foldable head restraints offer advantages over non-foldable head restraints, foldable head restraints are generally more difficult to assemble and therefore relatively more expensive. A foldable head restraint which is easier to manufacture and less expensive is thus desirable.

SUMMARY OF THE INVENTION

A foldable head restraint has two head restraint supports set within a bracket. The head restraint supports are comprised of a metal substrate and a section of an over-molded geometry. The over-molded geometry is generally plastic. A latch is made integral with the metal substrate. The latch rests against a stop to prohibit rotation of the head restraint support in a first direction and rests against a rotational cam to prohibit movement of the head restraint supports in a second direction. A user rotates the cam to an open position to allow the head restraint supports to be pivoted to a folded position. To reduce the size of the slots in the seatback which are often provided to accommodate foldable head restraints, the head restraint supports have a general shape of a "J". Other shapes and configurations are possible.

The metal substrate of the head restraint supports could be fine blanked, precision stamped, or manufactured by a close tolerance metal fabrication process thereby significantly reducing the cost of the head restraint support. The metal substrate can then be over-molded. The over-molded shape and cross-section can be varied as needed to allow mating of the head restraint supports with components found in the head restraint bun.

The head restraint supports for the primary side and the secondary side of the head restraint are identical, allowing for ease of mass production. Also, due to the geometry of the metal substrate and over-molded geometry the package size of the head restraint supports is more compact when compared to similar mechanisms.

These and other objects, advantages, and features of the invention will be more readily understood and appreciated by reference to the detailed description of the drawings.

DETAILED DESCRIPTION OF THE DRAWINGS

Figure 1:
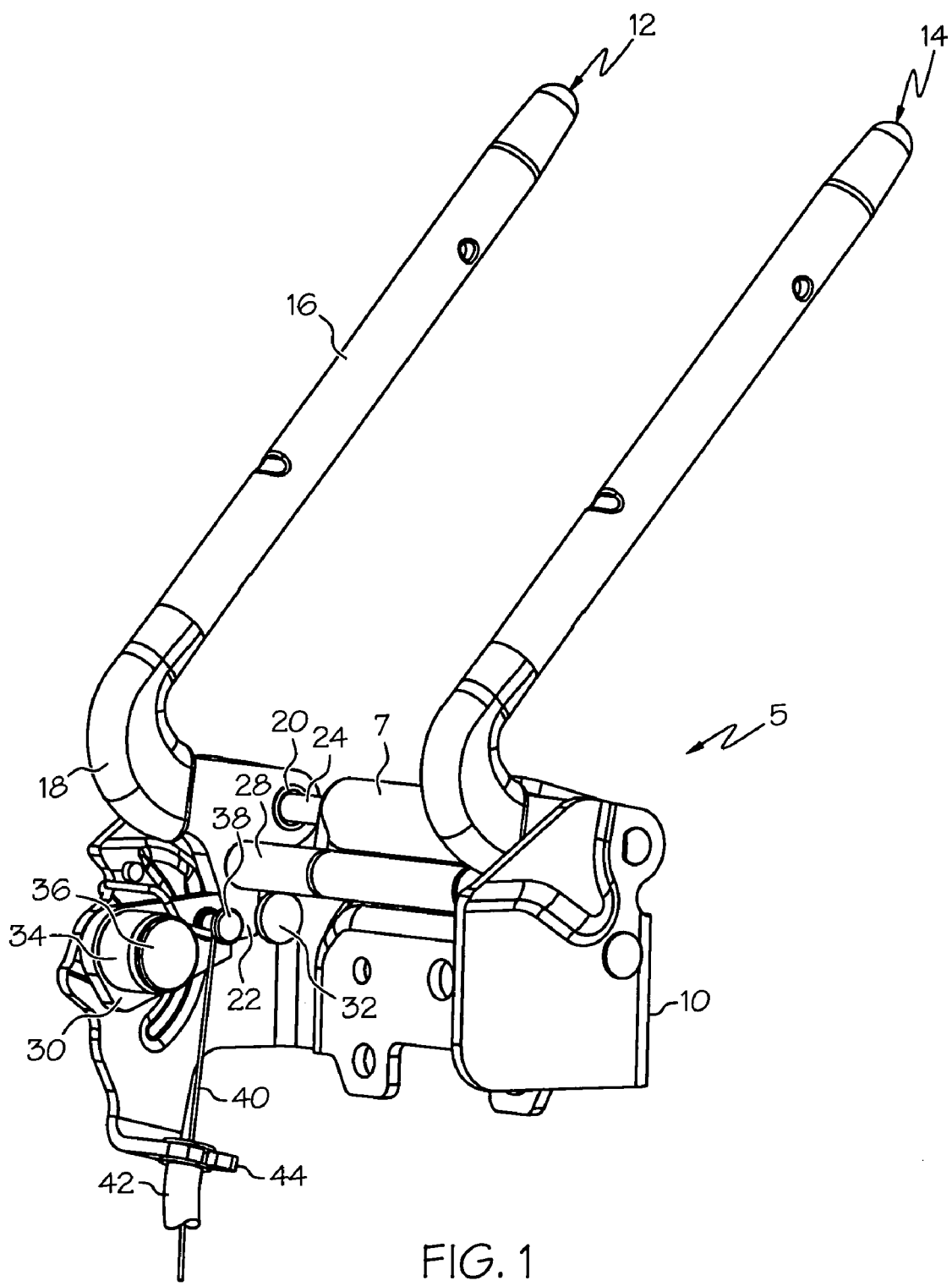
FIG. 1 is a perspective view of the primary side of the foldable head restraint.
Figure 1A:
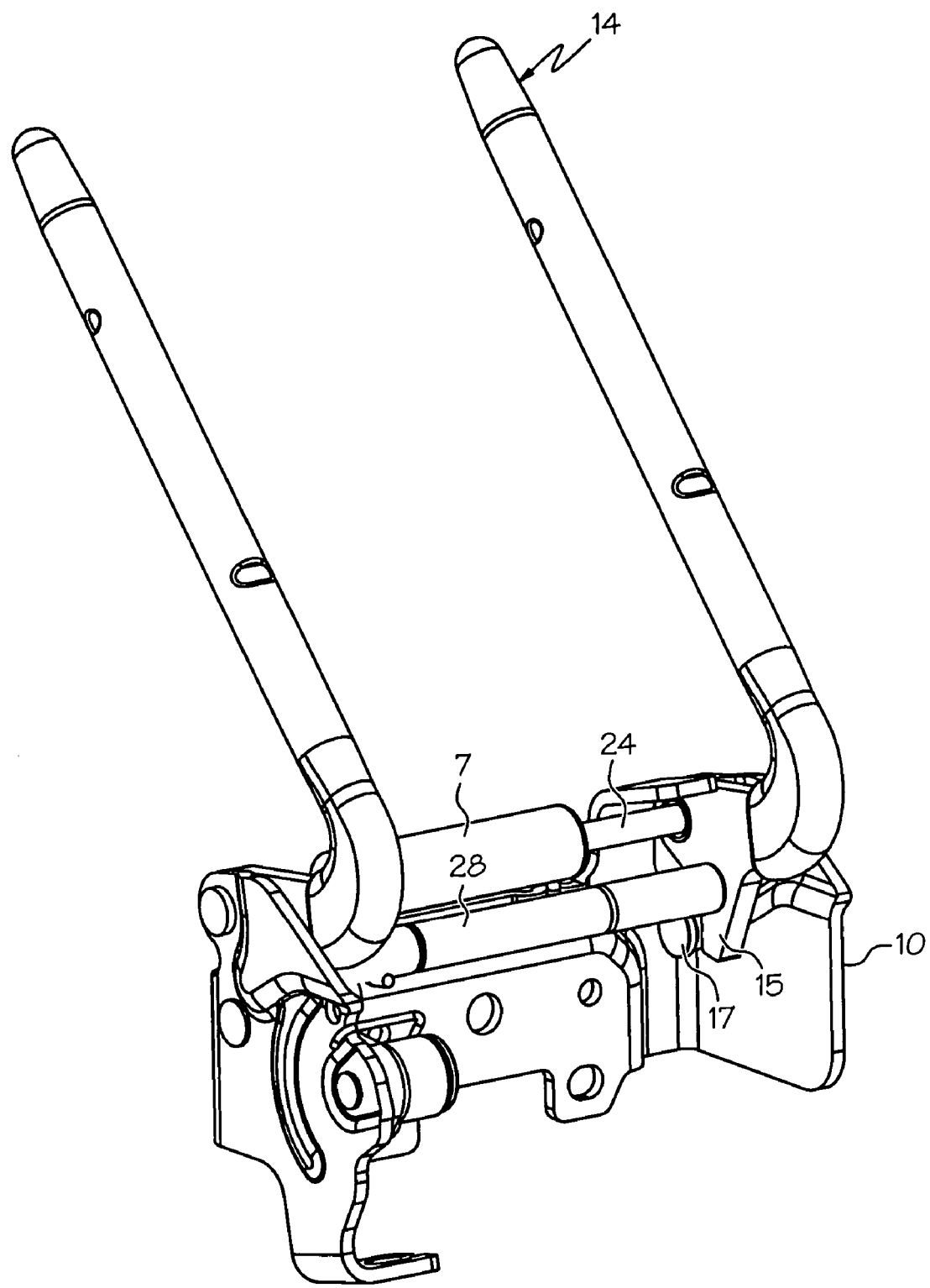
FIG. 1A is another perspective view of the secondary side of the foldable head restraint.

FIG. 1 shows foldable head restraint 5 viewing the primary side of foldable head restraint 5. Head restraint 5 includes bracket 10. Two head restraint supports 12, 14 are attached to bracket 10 and are rotatable within bracket 10. A bun is usually provided on head restraint supports 12, 14. FIG. 1A shows a view of the secondary side of head restraint 5. Head restraint support 14 also contains latch 22. Bracket 10 also includes stop pin 32 and stop pin 17.

Figure 2:
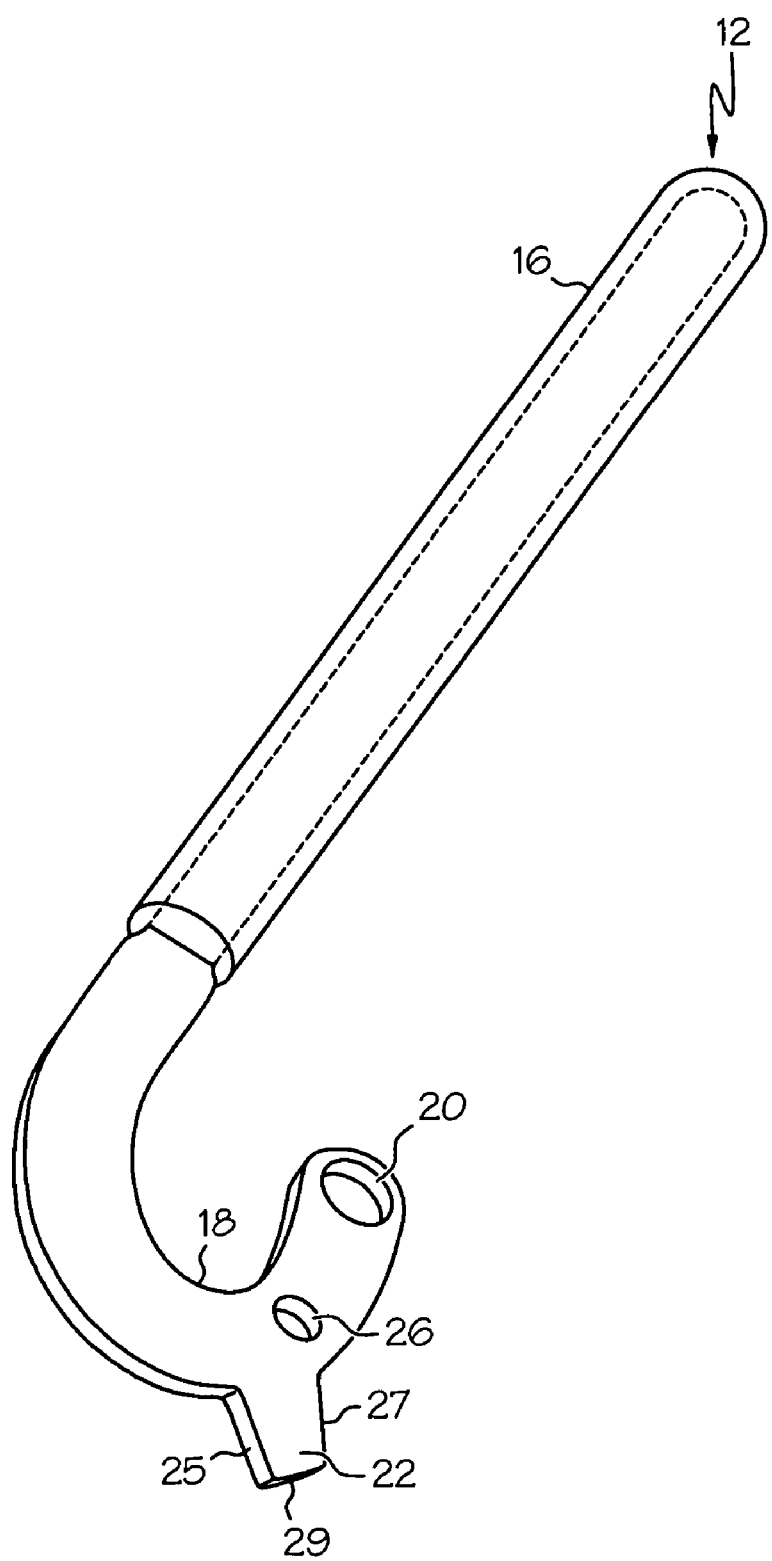
FIG. 2 shows a head restraint support used within the foldable head restraint.

FIG. 2 shows head restraint support 12. (Head restraint support 14 is identical in construction to head restraint support 12.) Over-molded geometry 16 of head restraint support 12 is attached to metal substrate 18. Over-molded geometry 16 is usually contained within a head restraint bun. Metal substrate 18 of head restraint support 12 includes pivot hole 20. Pivot hole 20 is configured so as to be capable of receiving pivot shaft 24, shown in FIG. 1. Rotational torsion spring 7 is placed about the middle of pivot shaft 24. Stabilizer hole 26 is configured so as to be capable of receiving stabilizer shaft 28, as shown in FIG. 1. Latch 22 protrudes from metal substrate 18. FIG. 2 shows surface 25, surface 27, and surface 29 of latch 22.

As shown in FIG. 1, latch 22 interacts with rotational cam 30 and stop pin 32 to provide the unique folding ability of head restraint 5. Rotational cam 30 has cam torsion spring 34 installed in a preloaded condition on cam pin 36. One end of cam torsion spring 34 is held by cable pin 38. Cam pin 36 and cable pin 38 are located on cam 30. The other end of cam torsion spring 34 is attached to bracket 10.

Cable wire 40 is also attached to cable pin 38. Cable wire 40 is part of cable 42. One end of cable 42 is attached to cable termination 44, which is normally integral to bracket 10. The other end of cable 42 may be attached to the vehicle body or to some other device, such as a manual release lever, in order to actuate the folding mechanism of head restraint 5.

Figure 3:
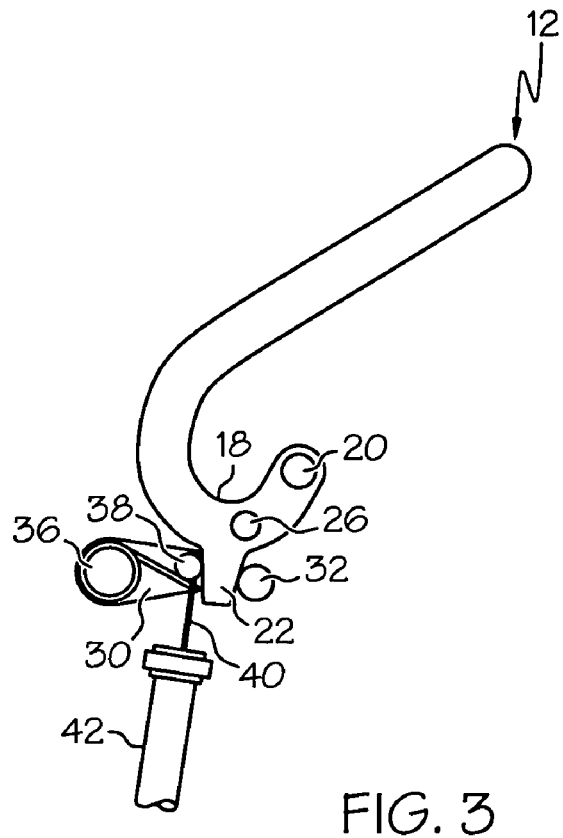
FIG. 3 is a side view of the foldable head restraint in the design position.
Figure 4:
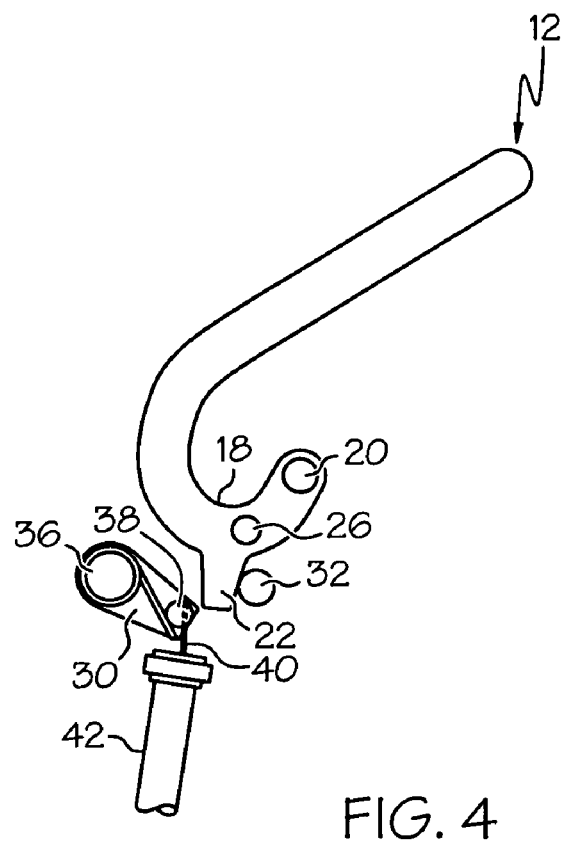
FIG. 4 is a side view of the foldable head restraint as the cam is being disengaged from the rotational lock.
Figure 5:
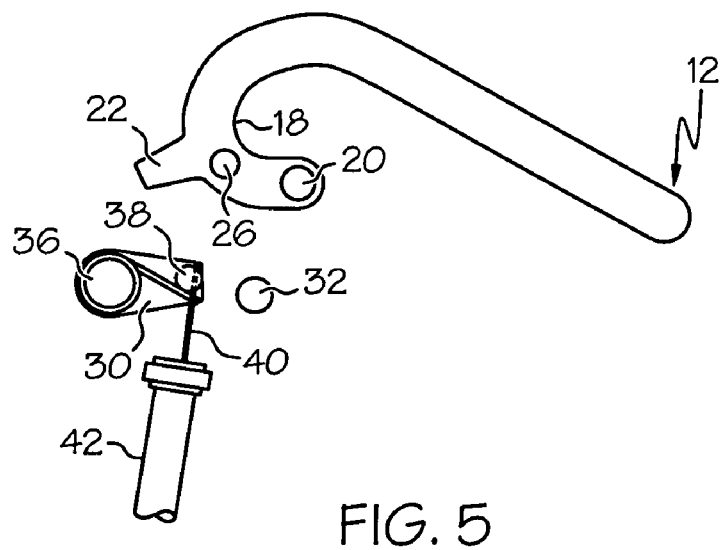
FIG. 5 is a side view of the foldable head restraint in the folded position.

FIGS. 3, 4 and 5 show the operation of the head restraint. FIG. 3 is a side view showing the head restraint in the design, or upright, position. Rotational cam 30 holds latch 22 securely against stop pin 32. Stop pin 32 is engaged with latch surface 27. The end of rotational cam 30 and latch surface 25 are generally designed such that when head restraint 5 is in the design position, there is firm engagement between the two, thereby minimizing chuck.

FIG. 4 is a side view showing the head restraint after sufficient tension has been exerted on cable wire 40 to move rotational cam 30. When sufficient tension is exerted on cable wire 40, cable pin 38 is pulled downward toward cable termination 44, causing rotational cam 30 to rotate. When rotational cam 30 has rotated sufficiently, latch 22 is no longer held against stop pin 32. Thus, head restraint supports 12, 14 are free to rotate toward the folded position.

The angle of head restraint supports 12, 14 relative to a vertical plane can be selected such that head restraint supports 12, 14 will immediately rotate toward the folded position when rotational cam 30 has rotated sufficiently to free latch 22 due to the force exerted on head restraint supports 12, 14 by torsion spring 7. Alternatively, the head restraint 5 could be designed such that some other force would need to be applied to head restraint supports 12, 14 to cause head restraint supports 12, 14 to rotate to the folded position.

FIG. 5 shows head restraint 5 in the folded position. In the folded position head restraint supports 12, 14 are near horizontal. Thus, the head restraint is neither a visual obstruction nor an obstruction during the kinematic movement of the seat. When tension is no longer applied to wire 40, torsion spring 34 causes rotational cam 30 to return to a position that will enable it to reengage the lock on latch 22.

Figure 6:
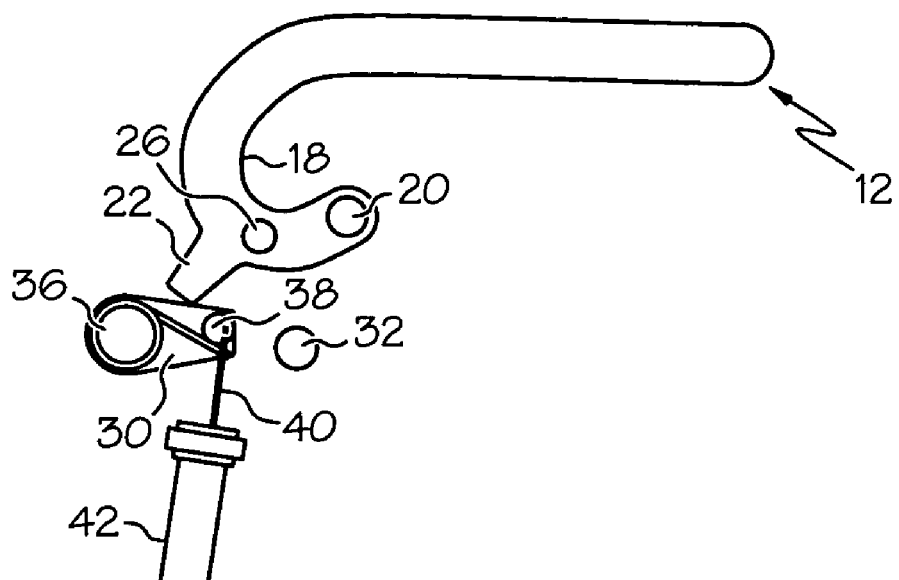
FIG. 6 is a side view of the foldable head restraint when it first contacts the rotational cam when returning to the design position.

To return head restraint 5 to the design position, a force is applied on head restraint supports 12, 14 usually through the head restraint bun. Head restraint support 12 rotates until latch 22 strikes rotational cam 30. Referring against FIG. 6, continued force applied to head restraint support 12 causes rotational cam 30 to rotate clockwise.

Figure 7:
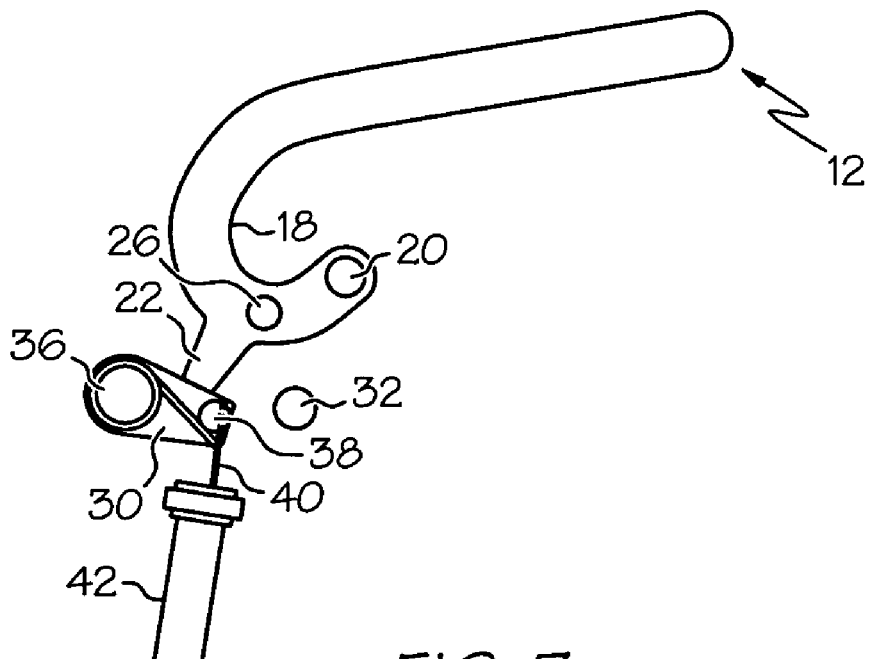
FIG. 7 is a side view of the foldable head restraint before it returns to the design position.

FIG. 7 shows the position of head restraint 5 just prior to returning to the design position. Rotational cam 30 has been rotated, causing latch surface 29 to be in contact with rotational cam 30. At this position, latch surface 29 is constructed such that it will allow the rotational cam 30 to clear the path of the rotating latch 22.

When a further force is applied to head restraint support 12, latch surface 29 causes rotational cam 30 to rotate further so that latch 22 can come to rest against stop pin 32. Due to the configuration of the surfaces of latch 22, head restraint support 12 is then locked into the design position by contact between rotational cam 30 and latch surface 25.

Metal substrate 18 can be fine blanked, precision stamped, or close tolerance metal fabricated component, and would preferably be made of a high strength steel. Metal substrate 18 can be over-molded. By varying the design of the over-molded geometry, head restraint support 12 could easily mate with a variety of head restraint buns. Rotational rod 24 and stabilizer shaft 28 are usually steel rods.

Bracket 10 is usually contained within a seat back. Head restraint supports 12, 14 extend through the top of the seat back through a pair of slots. In order to minimize the size of these slots, head restraints supports 12, 14 have the shape of a "J". Other shapes can be used for head restraint supports 12, 14 depending upon the particular application.

Assembly of head restraint 5 is simple. Head restraint supports 12, 14 are first joined by stabilizer shaft 28, and this assembly is then placed within bracket 10. Rotational rod 24 is inserted through bracket 10 and through head restraint supports 12, 14.

Figure 8:
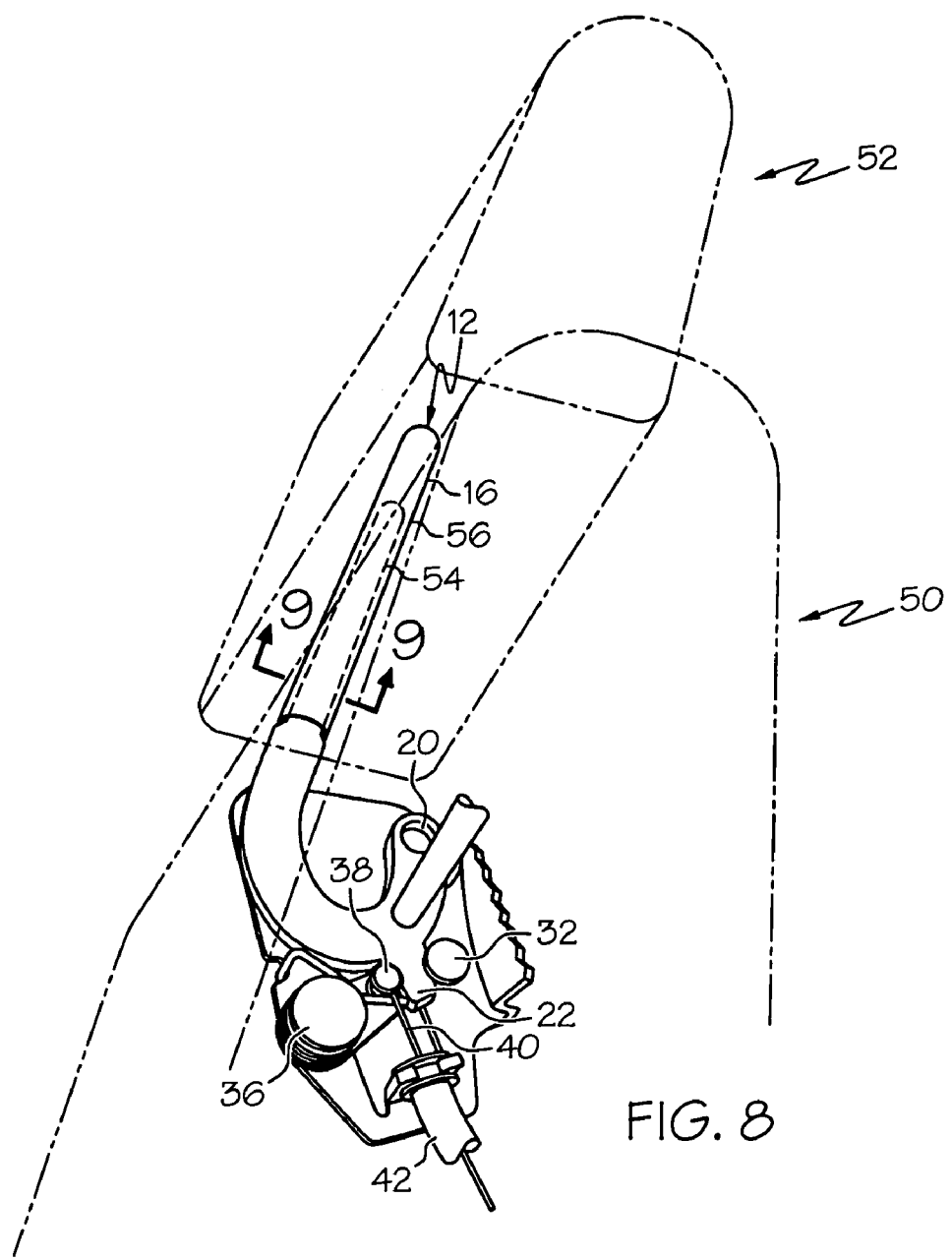
FIG. 8 is a side view of the foldable head restraint contained within a seat and a bun.
Figure 9:
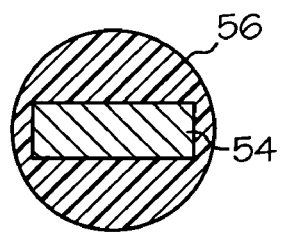
FIG. 9 is a cross-section of the foldable head restraint support.

FIG. 8 shows head restraint 5 contained within seat 50 and bun 52. FIG. 9 shows a cross-section of rod 16 at 9-9. Rod 16 is shown having steel portion 54 with plastic over-molding 56. The cross-section of steel portion 54 is generally rectangular and the cross-section rod 16 when fitted with over-molding 56 is generally circular, although other shapes may be utilized with the same intent and functionality.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A foldable head restraint which comprises a first head restraint support having a first elongate portion for receiving a bun thereon;
   a bracket;
   a latch mechanism;
   a torsion spring that biases a rotational cam in the first direction; and
   cable pin to which a first end of the torsion spring is attached,
   the latch mechanism including the rotational cam that can be selectively rotated independently of the first head restraint support between a latched position in which a second portion of the first head restraint support is engaged by an end surface of the rotational cam and thereby locked against pivotal movement and an unlatched position in which the second portion of the first head restraint support can pivot immediately over the rotational cam.

2. The foldable head restraint of claim 1, wherein the torsion spring has a second end that is attached to the bracket.

3. The foldable head restraint of claim 2, wherein the rotational cam is installed on a cam pivot pin and the torsion spring is mounted on the cam pivot pin.

4. The foldable head restraint of claim 3, wherein the cable pin is located at the first end of the rotational cam and the cam pivot pin is located at the second end of the rotational cam.

5. The foldable head restraint of claim 4, further comprising a second stop, the second stop attached to the bracket.

6. The foldable head restraint of claim 5, wherein the second head restraint support has a structure that engages with the second stop to prohibit motion of the second head support in a first direction.

7. The foldable head restraint of claim 6, wherein the bracket has a first side and a second side with the first stop located on the first side and the second stop located on the second side.

* * * * *